United States Patent [19]
Sakata et al.

[11] Patent Number: 5,119,178
[45] Date of Patent: Jun. 2, 1992

[54] VIDEO CAMERA WITH MANUAL COLOR BALANCE ADJUSTING OPTION

[75] Inventors: Masayuki Sakata; Akihiko Miyazaki, both of Tokyo, Japan

[73] Assignee: U.S. Philips Corporation, New York, N.Y.

[21] Appl. No.: 643,881

[22] Filed: Jan. 18, 1991

[30] Foreign Application Priority Data

Jan. 19, 1990 [JP] Japan ................... 2-10287

[51] Int. Cl.⁵ .......................... H04N 9/4; H04N 9/64
[52] U.S. Cl. ................................ 358/29; 358/10
[58] Field of Search ............... 358/29, 29 C, 10, 139, 358/41, 42

[56] References Cited

U.S. PATENT DOCUMENTS

| | | | |
|---|---|---|---|
| 4,249,197 | 2/1981 | van Spaandonk et al. | 358/29 C |
| 4,739,394 | 4/1988 | Oda et al. | 358/29 C |
| 4,951,134 | 8/1990 | Nakasuma et al. | 358/29 |

FOREIGN PATENT DOCUMENTS

| | | | |
|---|---|---|---|
| 0032620 | 3/1978 | Japan | 358/29 C |
| 0046593 | 3/1982 | Japan | 358/29 C |
| 0058485 | 4/1982 | Japan | 358/29 C |
| 0210089 | 10/1985 | Japan | 358/29 C |
| 0174892 | 8/1986 | Japan . | |
| 1035401 | 7/1966 | United Kingdom | 358/29 C |

*Primary Examiner*—James J. Groody
*Assistant Examiner*—Michael H. Lee
*Attorney, Agent, or Firm*—Edward W. Goodman

[57] ABSTRACT

A video camera whereby the photographer can switch from an automatic to a manual adjustment mode. In the manual mode a color bar chart on a lens cap is pictured on part of the viewfinder of the camera, while an electronically generated reference color bar chart is shown on the other part. The user adjusts one or two potentiometers, each adjusting the gain of a color signal amplifier, until the two color bar charts have the same colors.

7 Claims, 1 Drawing Sheet he present invention with its various features and modes of operation will become evident in the following description, taken in conjunction with the drawing.

VIDEO CAMERA WITH MANUAL COLOR BALANCE ADJUSTING OPTION

BACKGROUND OF THE INVENTION

The present invention relates to video cameras and, more particularly, to color video cameras having automatic or semi-automatic white balance control systems.

Video cameras are known in which automatic or semi-automatic white balance control circuits are supplied. In the fully automatic systems, the variation in color temperature of the illumination is measured by a photo sensor such as a photo diode. The output of the photo diode is signal processed and used in an electronic circuit to control the RB gains, thereby to obtain the white balance.

In the semi-automatic systems, the criterion for white balance is that the color-difference signal is 0 when a white object is shot. The camera is first directed to a white object and at the same time an automatic white control switch is depressed. Thereupon a color control is effected by the electronic circuit such that the color-difference signals become 0. After the above adjustment, the circuit conditions are maintained. When the shooting conditions have changed, it is necessary to depress the automatic white control switch again to obtain a proper adjustment.

The above circuits are state of the art. Their exact operation is not a part of the present invention and only as much of it as is necessary to explain the operation of the present invention will be described.

SUMMARY OF THE INVENTION

It is an object of the present invention to allow manual adjustment of the color balance in a television camera for those users who are not satisfied with the automatic control under given circumstances.

It is a further object of this invention to allow the manual adjustment to be carried out simply and rapidly and to maintain the manual adjustment until such time as the equipment is again switched to the automatic mode.

To accomplish the above purposes, according to the present invention, a color camera apparatus is provided. The color camera apparatus comprises a camera lens system, an image sensor for converting optical information of an object obtained through the camera lens system into a color picture signal, and a viewfinder for displaying a color picture of the object in response to the color picture signal characterized by the provision of:

an attachment which is provided with a color-bar chart to be shot through the camera lens system;
a signal generator for generating a color-bar signal representative of a reference color bar;
a viewfinder control circuit for furnishing a display in response to the color picture signal on a first part of the screen of the viewfinder and for displaying said reference color bar in response to said color-bar signal on a second part of said screen; and
a color-signal adjusting circuit for manually adjusting a level of a color signal in the color picture signal based on the displays in the viewfinder.

A further feature of the present invention is that the attachment is a lens cap for the camera lens system.

The present invention with its various features and modes of operation will become evident in the following description, taken in conjunction with the drawing.

DETAILED DESCRIPTION OF A PREFERRED EMBODIMENT OF THE INVENTION

Figure 1:
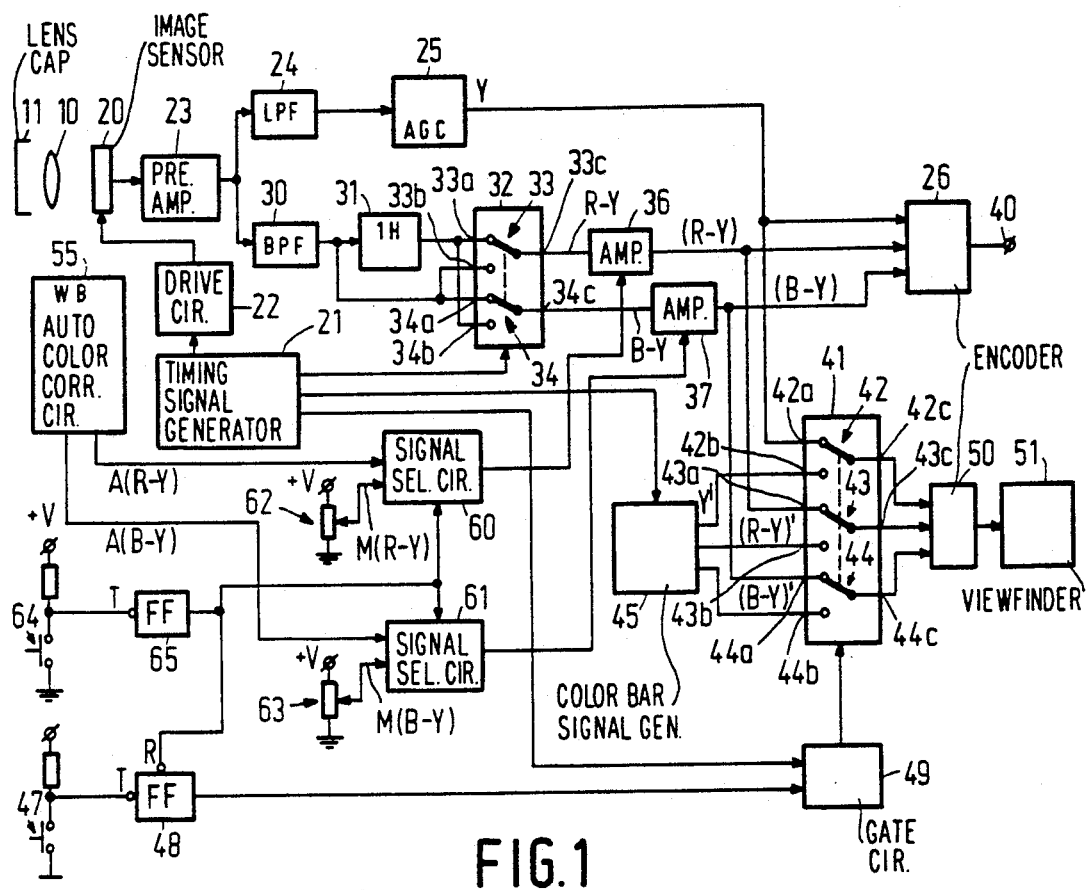
FIG. 1 is a block diagram illustrating the interconnection of the present invention with a color camera.

FIG. 1 shows in block diagram form as much of a standard television camera as is required to explain the interconnection to the present invention. Specifically, the camera has a lens system schematically indicated as 10 with a lens cap 11. An image sensor 20 is controlled by a timing signal generator 21 via a drive circuit 22. The output of sensor 20 is applied to a pre-amplifier 23. The output of preamplifier 23 is applied to a low-pass filter 24, whose output is applied to an automatic gain control stage 25. The output of gain control stage 25 is a luminance signal Y.

The output of pre-amplifier 23 is also applied to a band-pass filter 30. The output of band-pass filter 30 is applied to a 1H-delay 31 and to a terminal 34a of a switch 34. The output of 1H-delay 31 is applied to a terminal 33a of a switch 33. Terminal 33b of switch 33 also receives the output of band-pass filter 30 directly. Similarly, the output of 1H-delay 31 is also connected to terminal 34b of switch 34. The output of switch 33 alternates between terminal 33a and 33b and constitutes the R - Y signal. The output of switch 34, derived from a terminal 34c is the B - Y signal. R - Y is applied to the input of an amplifier 36, while B - Y is applied to the input of an amplifier 37. The outputs of amplifiers 36 and 37 are applied to corresponding inputs of an encoder 26, which also receives the Y signal from the output of stage 25. The video signal corresponding to the image received by the lens system is available at a terminal 40 at the output of stage 26.

The Y, R - Y and B - Y signals are also applied, respectively, to switch contacts 42a, 43a and 44a. Contacts 42b, 43b and 44b are connected to the corresponding outputs Y - (R-Y) and (B-Y) of a color-bar signal generator 45. Selector arms 42, 43, and 44 apply either the outputs from the small a contacts oz the outputs from the b contacts to an encoder 50. The latter operates under control of a gate circuit 49. The output of encoder 50 is applied to viewfinder 51. Gate circuit 49 operates under control of timing signals from timing generator 21 and the output of a flip-flop 48. The state of flip-flop 48 is dependent on the activation of the switch 47 and the output of a flip-flop 65, the output of the latter being connected to the reset input of flip-flop 48.

The input of flip-flop 65, the automatic-manual selector flip-flop, is connected to a switch 64. The output of flip-flop 65 controls two signal selection circuits, 60 and 61. Signal selection circuit 60 selects either the output of a potentiometer 62 or the A(R-T) signal at the output of the automatic color correction circuit 55. Similarly, signal selection circuit 61 selects either the output of a potentiometer 63 or the automatic correction signal A (B-Y) from circuit 55.

The above described circuit operates as follows, the automatic mode being described first.

The user operates push button switch 64 to reset flipflop 65. This causes flip-flop 48 also to be reset, connecting the first (a) contacts to the respective common contacts of switches 42, 43 and 44 of switch circuit 41.

The signal selection circuits 60 and 61 select the signals A(R-Y) and A(B-Y) and supply these signals to the variable-gain amplifiers 36 and 37, respectively. The luminance signal Y in the color video signal supplied by the image sensor 20 is transferred from the AGC circuit 25 to the encoder 26, while the color-difference signals R-Y and B-Y are supplied via the abovementioned amplifiers 36 and 37 to the encoder 26. In this case, the gains of the amplifiers 36 and 37 are automatically controlled in response to the outputs A(R-Y) and A(B-Y) of the automatic color correction circuit 55, so that the optimum white-balance is obtained. The luminance signal Y and the color-difference signals R-Y and B-Y are also supplied through the switch circuit 41 to the second encoder 50, so that the user can monitor the picture which is being shot in the electronic color viewfinder 51.

Figure 4:
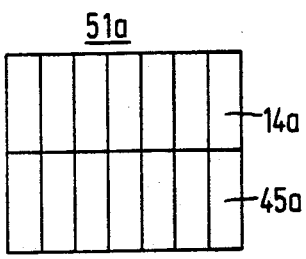
FIG. 4 illustrates the viewfinder during the adjustment mode.

When it is desired to adjust the color balance manually, the user mounts the lens cap 11 on the camera lens system 10, depresses the switch 64 to set the flip-flop 65, and then depresses the switch 47 to bring the flip-flop 48 into the set state. As a result, the signals M(R-Y) and M(B-Y) are applied to the variable-gain amplifiers 36 and 37, respectively, and gate circuit 49 is brought into operation. The latter causes switching circuit 41 to supply a color video signal represented by the signals Y, R-Y and B-Y to the viewfinder 51 in the early half of each field period, while a color video signal represented by the signals Y', (R-Y)' and (B-Y)' is supplied to the viewfinder 51 in the latter half of each field period. Since the above signals Y, R-Y and B-Y represent the color-bar chart 14 on the lens cap 11 and since the signals Y', (R-Y)' and (B-Y)' represent the reference color-bar chart, the color bar 14a at the current color temperature is displayed on the upper half of screen 51a of viewfinder 51 while the reference color bar 45a is displayed in the lower half, as shown in FIG. 4. The user then usually compares the color bars 14a and 45a with each other and manipulates the potentiometers 62 and 63 to adjust the respective gains of the amplifiers 36 and 37, so that the color tones of the two color bars are the same.

When the color balance has thus manually been adjusted to the desired state, the user removes the lens cap 11 and again depresses the switch 47 to reset the flip-flop 48, whereupon the gate circuit 49 is disabled. As a result, only the signals Y, R-Y and B-Y pass through the switch circuit 41, so that the user can monitor the picture which is to be taken in this manual mode in viewfinder 51.

Figure 2:
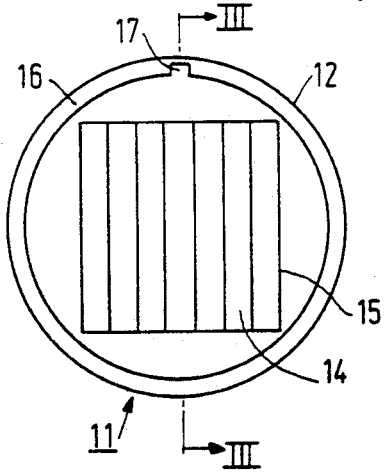
FIG. 2 is a front view of the color-bar chart in the lens cap.
Figure 3:
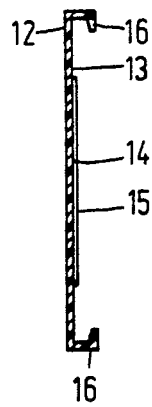
FIG. 3 is a side view of the lens cap.

FIG. 2 shows the lens cap with color bar chart 14 in a front view, while FIG. 3 is a sectional view along axis III-III of the same elements. In FIG. 4, the viewfinder 51a is pictured showing, on top, the image 14a of color bar chart 14 obtained under the present lighting conditions, and, below, the standard color bar chart 45a furnished by color bar signal generator 45. These conditions correspond to the manual adjustment mode.

Although the present invention has been described in a preferred embodiment, many variations in circuits and switching arrangements will readily occur to one skilled in the art and are intended to be encompassed in the following claims.

We claim:

1. A color camera apparatus which comprises a camera lens system, an image sensor for converting optical information of an object obtained through the camera lens system into a color picture signal, and a viewfinder for displaying a color picture of the object in a response to the color picture signal, said apparatus further comprising:

an attachment which is provided with a color-bar chart to be shot through the camera lens system and converted into a color picture signal;

a signal generator for generating a reference color-bar signal representative of a reference color-bar;

a viewfinder control circuit for performing a display of the color-bar chart based on the color picture signal on one part of a screen of the viewfinder and for displaying said reference color-bar based on said reference color-bar signal on another part of said screen; and a color-signal adjusting circuit for manually adjusting a level of a color signal in the color picture signal based on the viewfinder display.

2. A color camera apparatus according to claim 1, wherein said attachment is a lens cap for the camera lens system, said lens cap being provided on its surface on the side of the camera lens system with said color-bar chart.

3. A color camera apparatus according to claim 2, wherein said lens cap is made, at least at that part thereof which corresponds to said color-bar chart, of a semi-transparent material of a milky-white color.

4. A color camera apparatus according to claim 1, wherein said color-signal adjusting circuit comprises a manually operable potentiometer, and a variable gain amplifier for changing the color-signal level of the color picture signal in accordance with an output of said potentiometer.

5. A color camera apparatus according to claim 1, wherein said viewfinder control circuit comprises a selecting circuit for selecting the color picture signal in a first period of each display field and for selecting said reference color-bar signal in a second period of each display field, and a display control circuit for effecting a display control of the viewfinder in accordance with a signal selected by said selecting circuit.

6. A color camera apparatus according to claim 5, wherein said viewfinder control circuit further comprises a manually operable switch, said selecting circuit selecting the color picture signal in said reference first period and said color-bar signal in said second period when said switch is in a first state, said selecting circuit selecting the color picture signal in said first and second periods when said switch is in a second state.

7. A color camera appartus according to claim 4, wherein said color-signal adjusting circuit comprises a sensor unit which outputs an automatic color adjusting signal for adjusting a gain of said variable gain amplifier based on primary color components of an exterior light obtained in the vicinity of the camera lens system, an automatic/manual selection switch for selecting an automatic mode or a manual mode, a second selecting circuit for supplying said automatic color adjusting signal to said variable gain amplifier when said automatic mode is selected by said automatic/manual selection switch and for supplying the output of said potentiometer to said variable gain amplifier when said manual mode is selected by said automatic/manual selection switch.

* * * * *